(12) United States Patent
Wells et al.

(10) Patent No.: US 12,372,108 B2
(45) Date of Patent: Jul. 29, 2025

(54) ROTATABLE FORKEND CONNECTION SYSTEM

(71) Applicant: Xtreme Structures & Fabrication, LLC, Sulphur Springs, TX (US)

(72) Inventors: Michael Wells, Sulphur Springs, TX (US); Mark Newlin, Grey Forest, TX (US); Clifton Robbins, Yantis, TX (US)

(73) Assignee: Xtreme Structures & Fabrication, LLC, Sulphur Springs, TX (US)

( * ) Notice: Subject to any disclaimer, the term of this patent is extended or adjusted under 35 U.S.C. 154(b) by 714 days.

(21) Appl. No.: 17/214,654

(22) Filed: Mar. 26, 2021

(65) Prior Publication Data

US 2021/0301520 A1 Sep. 30, 2021

Related U.S. Application Data

(60) Provisional application No. 63/000,321, filed on Mar. 26, 2020.

(51) Int. Cl.
*F16B 7/04* (2006.01)
*E04B 1/24* (2006.01)

(52) U.S. Cl.
CPC .... *F16B 7/0406* (2013.01); *E04B 2001/2439* (2013.01); *Y10T 403/32861* (2015.01)

(58) Field of Classification Search
CPC ...... F16B 7/0406; F16B 7/0413; F16B 7/042; F16B 7/0446; E04B 2001/2439;

(Continued)

(56) References Cited

U.S. PATENT DOCUMENTS 2,982,379 A * 5/1961 Fisher ................ E04H 12/185
403/171
3,902,817 A * 9/1975 Meir ........................ F16B 7/20
403/349

(Continued)

FOREIGN PATENT DOCUMENTS

EP 3865717 A1 * 8/2021
WO WO-2018189759 A4 * 12/2018 ......... A47B 47/0016

OTHER PUBLICATIONS

Total Structures; "Omni Medium Duty Datasheet"; https://www.totalstructures.com/product/omni-medium-duty/; Oct. 15, 2018; 2 pages.

(Continued)

*Primary Examiner* — Amber R Anderson
*Assistant Examiner* — Kevin J Baynes
(74) *Attorney, Agent, or Firm* — Conley Rose, P.C.; Brooks W Taylor (57) ABSTRACT

A rotatable forkend connection system is provided that includes a shank and a forkend connector. The shank is fixedly coupled to a device member and extends within the device member along a longitudinal axis of the device member. The shank includes a protrusion extending from the shank in a direction perpendicular to the longitudinal axis of the device member. The forkend connector is rotatably coupled to the shank and has an axis of rotation coaxial with the longitudinal axis of the device member. The forkend connector includes a recess configured to receive the protrusion. The protrusion and the recess are configured to restrain the forkend connector from moving along the longitudinal axis of the device member.

4 Claims, 11 Drawing Sheets

(58) Field of Classification Search
CPC ...... E04B 2001/2451; E04B 2001/2457; E04F 11/1834; Y10T 403/32861; Y10T 403/32918; Y10T 403/7182; F16D 3/387; F16D 7/048; F16D 43/2028
USPC .............................. 403/235, 236; 52/848, 849
See application file for complete search history.

(56) References Cited

U.S. PATENT DOCUMENTS

| | | | | |
|---|---|---|---|---|
| 6,321,501 | B1 * | 11/2001 | Ignash | E04H 12/10 52/645 |
| 6,533,666 | B2 * | 3/2003 | Garcia | B62D 7/224 464/89 |
| 6,554,524 | B1 * | 4/2003 | Smith | H02G 7/04 403/322.2 |
| 6,672,792 | B1 * | 1/2004 | Schipani | F16B 7/042 52/584.1 |
| 6,675,546 | B2 | 1/2004 | Coles | |
| 6,949,026 | B2 * | 9/2005 | Morsches | F16D 3/387 464/112 |
| 7,029,398 | B1 * | 4/2006 | Burnard | F16D 3/387 403/14 |
| 7,197,856 | B2 * | 4/2007 | Coles | E04C 3/005 52/693 |
| 8,028,488 | B2 * | 10/2011 | Dodd | E04H 12/187 52/645 |
| 8,641,312 | B2 * | 2/2014 | Todd, IV | E04H 3/28 403/165 |
| 9,545,942 | B2 * | 1/2017 | Tinnin | F16D 3/387 |
| 9,650,779 | B2 | 5/2017 | Tello | |
| 9,863,138 | B2 | 1/2018 | Tello | |
| 9,993,677 | B2 * | 6/2018 | Todokoro | A63B 71/04 |
| 10,760,263 | B2 * | 9/2020 | Hossler | E04B 1/388 |
| 2011/0101184 | A1 * | 5/2011 | Kirby | H01Q 3/08 343/890 |
| 2015/0330457 | A1 * | 11/2015 | Koiso | F16D 1/068 264/155 |

OTHER PUBLICATIONS

Tyler Truss Systems; "Glossary"; https://tylertruss.com/glossary/#index-spigot; Feb. 28, 2021; 4 pages.

* cited by examiner

ROTATABLE FORKEND CONNECTION SYSTEM

CROSS-REFERENCE TO RELATED APPLICATIONS

This application claims priority to U.S. Provisional Application No. 63/000,321 filed on Mar. 26, 2020 by Michael Wells, et al. entitled, "Rotatable Forkend Connection System", which is incorporated by reference herein as if reproduced in its entirety.

TECHNICAL FIELD

The present application relates generally to truss structures and, more specifically, to a rotatable forkend connection system for use with trusses and scaffolding.

BACKGROUND

Truss structures may be used to support lights, speakers, screens, scenery, drapes, or other equipment in performance or display spaces. For ease of transporting such truss structures, the structure may be assembled on site from modular segments that are bolted or otherwise coupled together. The assembled truss structure may then be attached to an overhead building structure or to ground-based overhead supports and raised above the performance or display space.

SUMMARY OF THE DISCLOSURE

In accordance with a first aspect of the present disclosure, there is provided a rotatable forkend connection system that includes a shank and a forkend connector. The shank is fixedly coupled to a device member and extends within the device member along a longitudinal axis of the device member. The shank includes a protrusion extending from the shank in a direction perpendicular to the longitudinal axis of the device member. The forkend connector is rotatably coupled to the shank and has an axis of rotation coaxial with the longitudinal axis of the device member. The forkend connector includes a recess configured to receive the protrusion. The protrusion and the recess are configured to restrain the forkend connector from moving along the longitudinal axis of the device member.

In accordance with a second aspect of the present disclosure, there is provided a rotatable forkend connection system that includes a forkend connector assembly that includes a forkend connector fixedly coupled to a shaft, and a protrusion extending from the shaft in a direction perpendicular to a longitudinal axis of the shaft. The shaft is rotatably coupled to a device member and extends within the device member along a longitudinal axis of the device member. An axis of rotation of the shaft is coaxial with the longitudinal axis of the device member. The protrusion is configured to engage a recess in the device member, and the protrusion and the recess are configured to prevent the forkend connector from moving along the longitudinal axis of the device member.

In accordance with a third aspect of the present disclosure, there is provided a rotatable forkend connection system that includes a forkend connector assembly that includes a forkend connector fixedly coupled to a shaft having a circumferential groove. The shaft is rotatably coupled to a device member and extends within the device member along a longitudinal axis of the device member. An axis of rotation of the shaft is coaxial with the longitudinal axis of the device member. The circumferential groove is configured to receive a protrusion extending inward from a wall of the device member in a direction perpendicular to the longitudinal axis of the device member. The protrusion and the circumferential groove are configured to prevent the forkend connector from moving along the longitudinal axis of the device member.

Other technical features may be readily apparent to one skilled in the art from the following figures, descriptions and claims.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged modular truss section.

Figure 1:
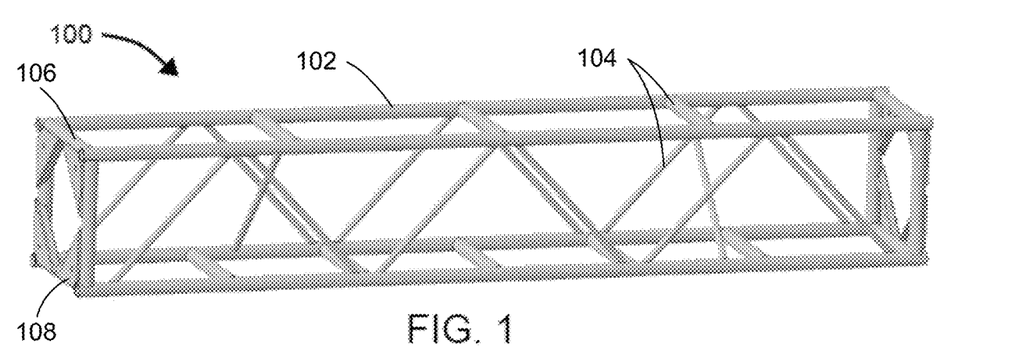
FIG. 1 presents an isometric view of a truss section.

FIG. 1 presents an isometric view of a conventional truss section 100. The truss section 100 includes four tubular chords 102 extending longitudinally along the truss section. Tubular braces 104 extend horizontally and diagonally between the chords and, typically, are welded to the chords. Each end of the truss section 100 includes cross-bars 106 connecting pairs of chords 102 at the ends of the chords 102 and connection plates 108 welded to the cross-bars 106. The truss section 100 may be placed end-to-end with a similar truss section 100, with bolts or other connectors placed through adjacent holes in the connector plates 108 to clamp the two truss sections 100 together. In this way, a longer truss may be assembled from truss sections.

Figure 2A:
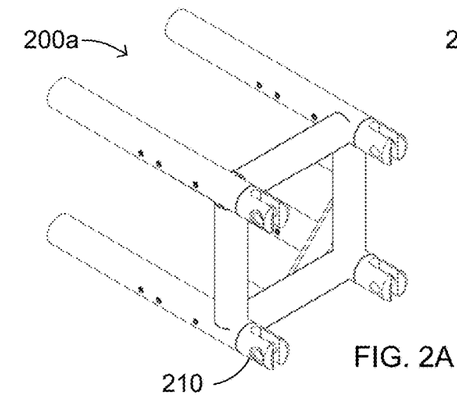
FIGS. 2A and 2B present isometric views of portions of two trusses having typical female and male forkend connectors (respectively).
Figure 2B:
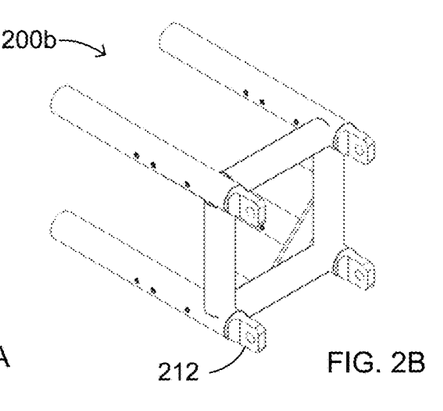

FIGS. 2A and 2B presents isometric views of portions of truss sections 200a and 200b (respectively) having typical female and male forkend connectors (210 and 212 respectively, four of each). The connectors 210 and 212 provide an alternative technique for coupling truss sections. The male connector 212 comprises a single tang or blade. The female connector 210 comprises two tangs or blades that bracket the single tang of the male connector 212. A truss section is fabricated with a female connector 210 in each of the four truss chords at one end, and a male connector 212 in each of the four truss chords at the other end. FIGS. 2A and 2B may be considered to show opposite ends of a single truss section, or female and male connector ends of two separate truss sections.

Figure 2C:
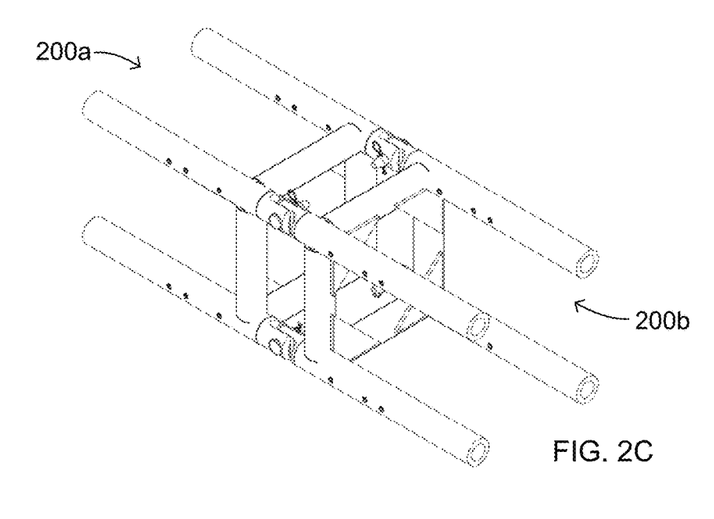
FIG. 2C presents an isometric view of the two portions of truss sections (here labeled 200a and 200 from FIGS. 2A and 2B coupled by the forkend connectors.

FIG. 2C presents an isometric view of the two portions of truss sections (here labeled 200a and 200b) from FIGS. 2A and 2B coupled by the forkend connectors. The tang of male connectors 212 of truss section 200b have been inserted between the tangs of the female connectors 210 of truss section 200a. Clevis pins have been inserted into the holes of each pair of forkend connectors to mechanically couple the forkend connectors and truss sections, and cotter pins have been inserted into corresponding holes near the tip of each Clevis pin to prevent the Clevis pins from being withdrawn (through, e.g., vibration or inadvertent contact) and decoupling the truss sections 200a and 200b. Greater detail of the elements of the connection between the two truss sections 200a and 200b may be seen in FIG. 3.

Figure 3:
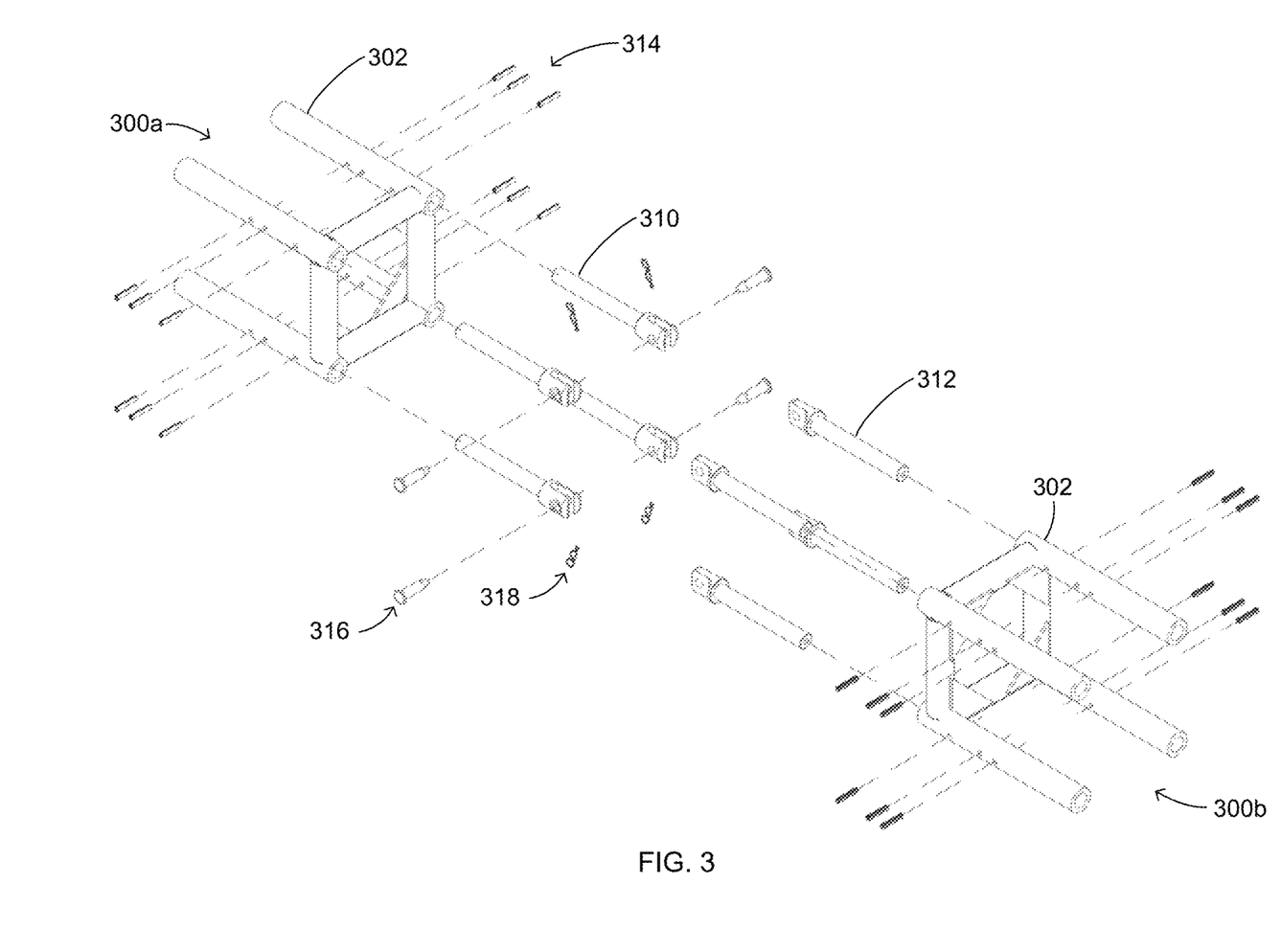
FIG. 3 presents an exploded view of the portions of the truss and forkend connectors of FIGS. 2A-2C.

FIG. 3 presents an exploded view of the portions of the truss and forkend connectors of FIGS. 2A-2C. Truss section 300a includes four truss chords 302. Four female connectors 310 are inserted into the chords 302, and the female connectors 310 and their corresponding chords 302 are fixedly coupled by twelve pins 314 (three for each connector 310 and chord 302) that are inserted through holes in the chords 302 and corresponding holes (not shown) in the female connectors 310. Four male connectors 312 are similarly fixedly coupled to truss section 300b. The pins 314 not only prevent the connectors from being withdrawn from the truss sections, they also prevent the connectors from rotating relative to the truss sections. As described with reference to FIG. 2C, assembled truss sections 300a and 300b are coupled by the connectors 310 and 312, and four Clevis pins 316 are installed in each pair of connectors and secured into place by four cotter pins 318.

Figure 4A:
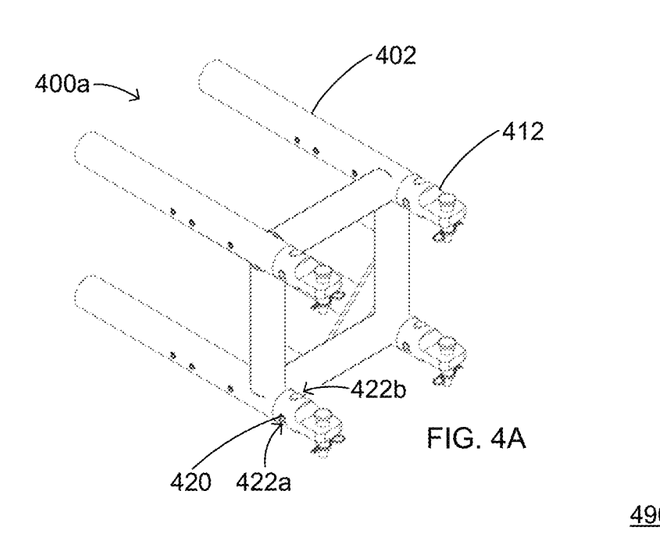
FIGS. 4A and 4B present isometric views of portions of truss sections having a first embodiment of rotatable forkend connection systems according to the disclosure in a first configuration.
Figure 4B:
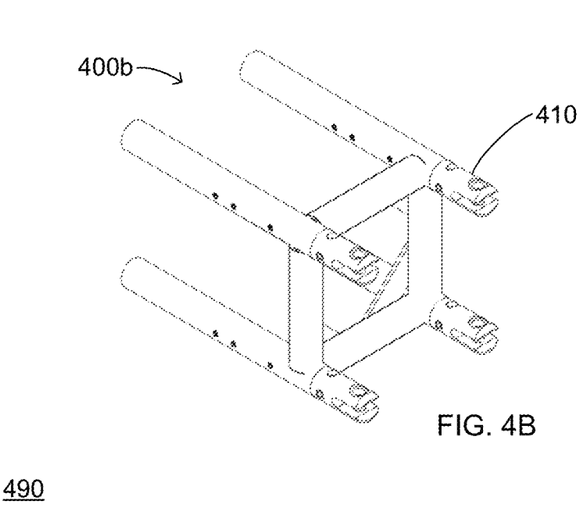

FIGS. 4A and 4B present isometric views of portions of truss sections 400a and 400b having a first embodiment of rotatable forkend connection systems 490 according to the disclosure in a first configuration. The first embodiment of the rotatable forkend connection system 490 includes the elements shown in FIGS. 4A-D and described herein, other than the truss chords 402, and the Clevis pins and cotter pins (not labeled). Male and female forkend connectors (412 and 410 respectively, four of each) are rotatably coupled to shanks (not visible) that are fixedly coupled to truss chords 402 (as will be explained in greater detail with reference to FIGS. 6 and 7). The axes of rotation of each connector 410 and 412 is coaxial with the longitudinal axis of its corresponding truss chord 402. A pin 420 extends through each shank, protruding outward from the shank at each end of the pin 420. Slots (or recesses) 422a and 422b on opposite sides of the connector 412 each receives one end of the pin. The tangs of the connectors 410 and 412 are oriented horizontally in the first configuration.

Figure 4C:
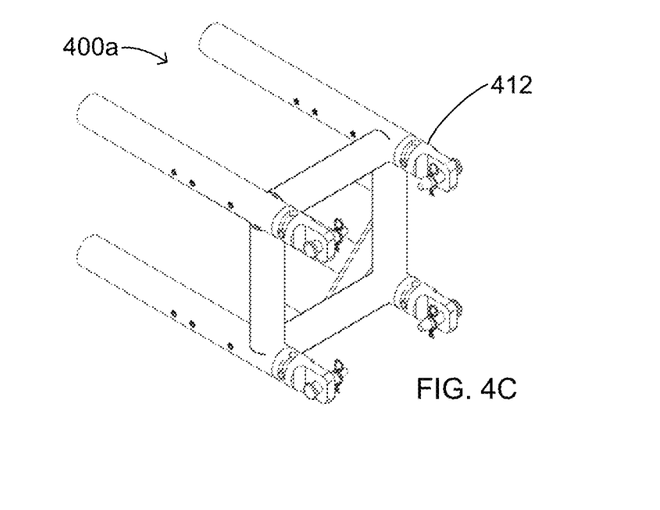
FIGS. 4C and 4D present isometric views of portions of the truss sections of FIGS. 4A and 4B having the forkend connectors in a second configuration.
Figure 4D:
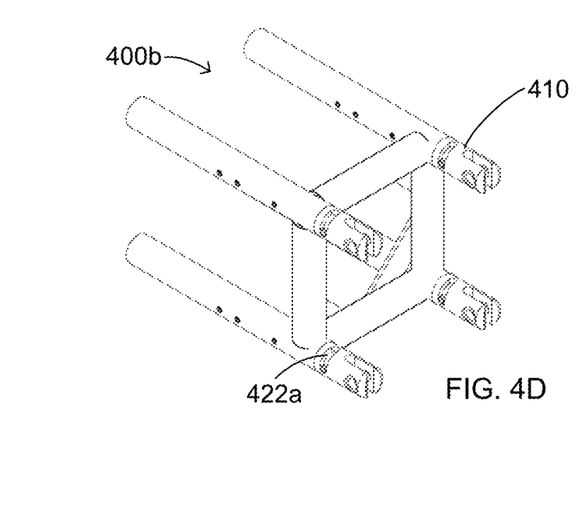

FIGS. 4C and 4D present isometric views of portions of the truss sections 400a and 400b of FIGS. 4A and 4B having the male and female forkend connectors (412 and 410 respectively) in a second configuration. The connectors 410 and 412 have been rotated 90 degrees clockwise (as viewed looking from the connectors toward the truss chords). The tangs of the connectors 410 and 412 are oriented vertically in the second configuration. The pins 420 and the slots 422a and 422b are configured to constrain rotation of each connector 410 and 412 to 90 degrees. Additionally, the configuration of the pins 420 and the slots 422a and 422b restrain each connector 410 and 412 from moving toward or away from its corresponding truss chord 402 along the longitudinal axis of the truss chord 402.

While the first embodiment of forkend connectors 410 and 412 shown in FIGS. 4A-4D have pins 420 that protrude from the shank at two places and two slots 422a and 422b subtending 90 degrees that engage those two protrusions, it will be understood that in other embodiments the slots 422a and 422b may subtend any extent of rotation less than 180 degrees that allows the connectors 410 and 412 to remain suitably strong for loads the truss sections 400*a* and 400*b* may encounter. In still other embodiments, the shank may have a pin that extends at only one end from the nub and connectors 410 and 412 have a single slot 422*a* that subtends 45, 180, 270 degrees or any other selected extent of rotation.

Figure 5A:
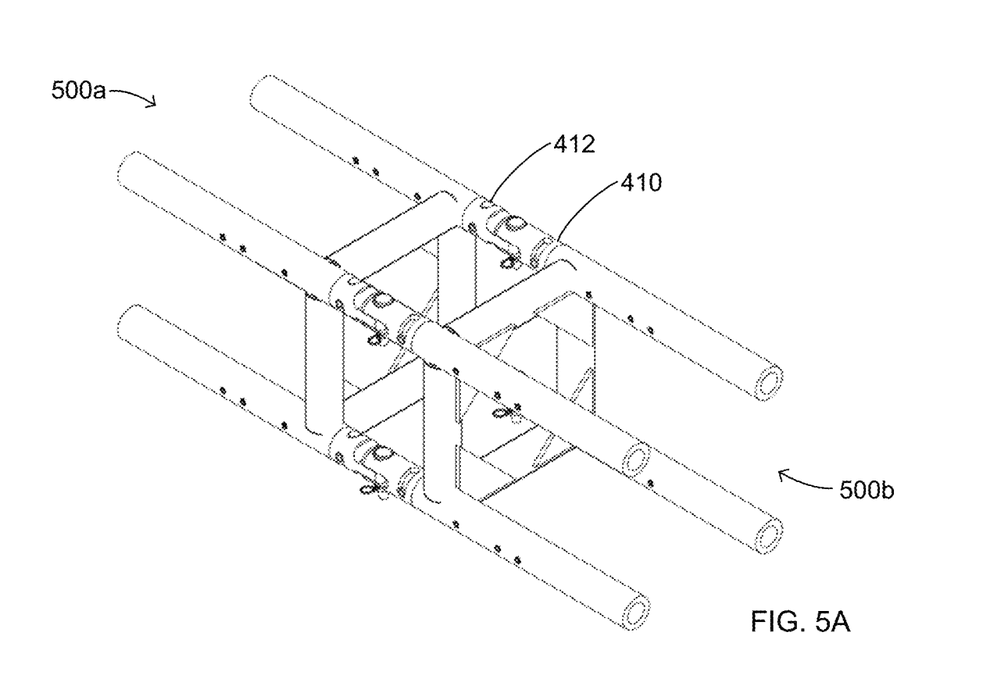
FIGS. 5A and 5B present isometric views of portions of truss sections coupled by the forkend connectors from FIGS. 4A-4D in the first and second configurations, respectively.
Figure 5B:
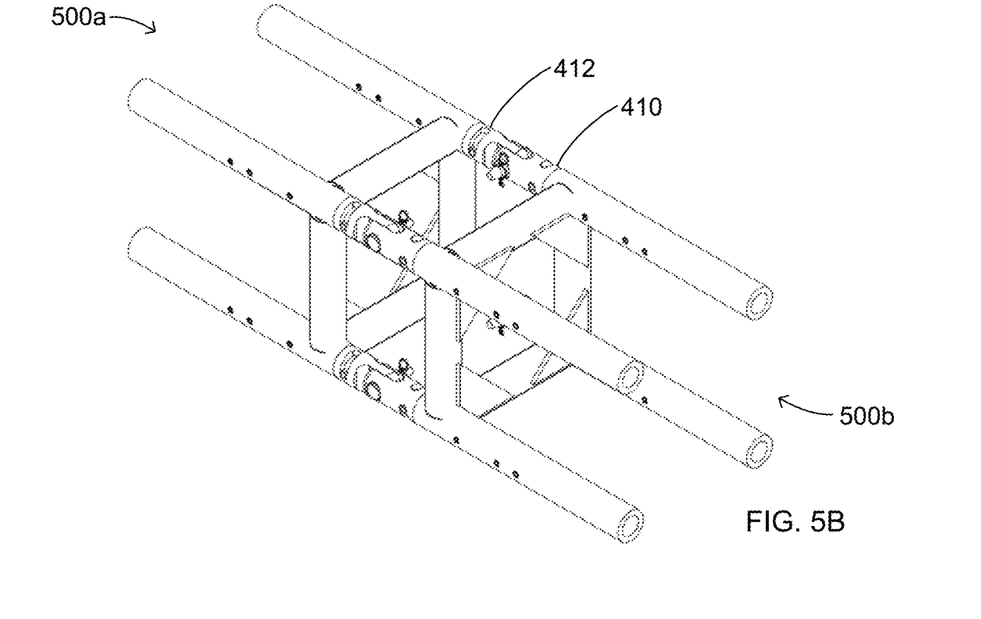

FIGS. 5A and 5B present isometric views of portions of truss sections coupled by the forkend connectors from FIGS. 4A-4D in the first and second configurations, respectively. The tang of the four male connectors 412 of truss section 500*a* have been inserted between the tangs of the four female connectors 410 of truss section 500*b*. Four Clevis pins have been inserted into the holes of each pair of forkend connectors to mechanically couple the forkend connectors and truss sections, and four cotter pins have been inserted into corresponding holes near the tip of each Clevis pin to prevent the Clevis pins from withdrawing and decoupling the truss sections 500*a* and 500*b*.

As described with reference to FIGS. 4A-4D, the connectors 410 and 412 rotate clockwise to change from the first to the second configuration and can rotate no further in that direction, once in the second configuration. FIGS. 5A and 5B illustrate that, when coupled, clockwise rotation of the female connectors 410 corresponds to counterclockwise rotation of the male connectors 412. As a result, each of connectors 410 and 412 prevents the other connector from rotating once the connectors are coupled.

Figure 6:
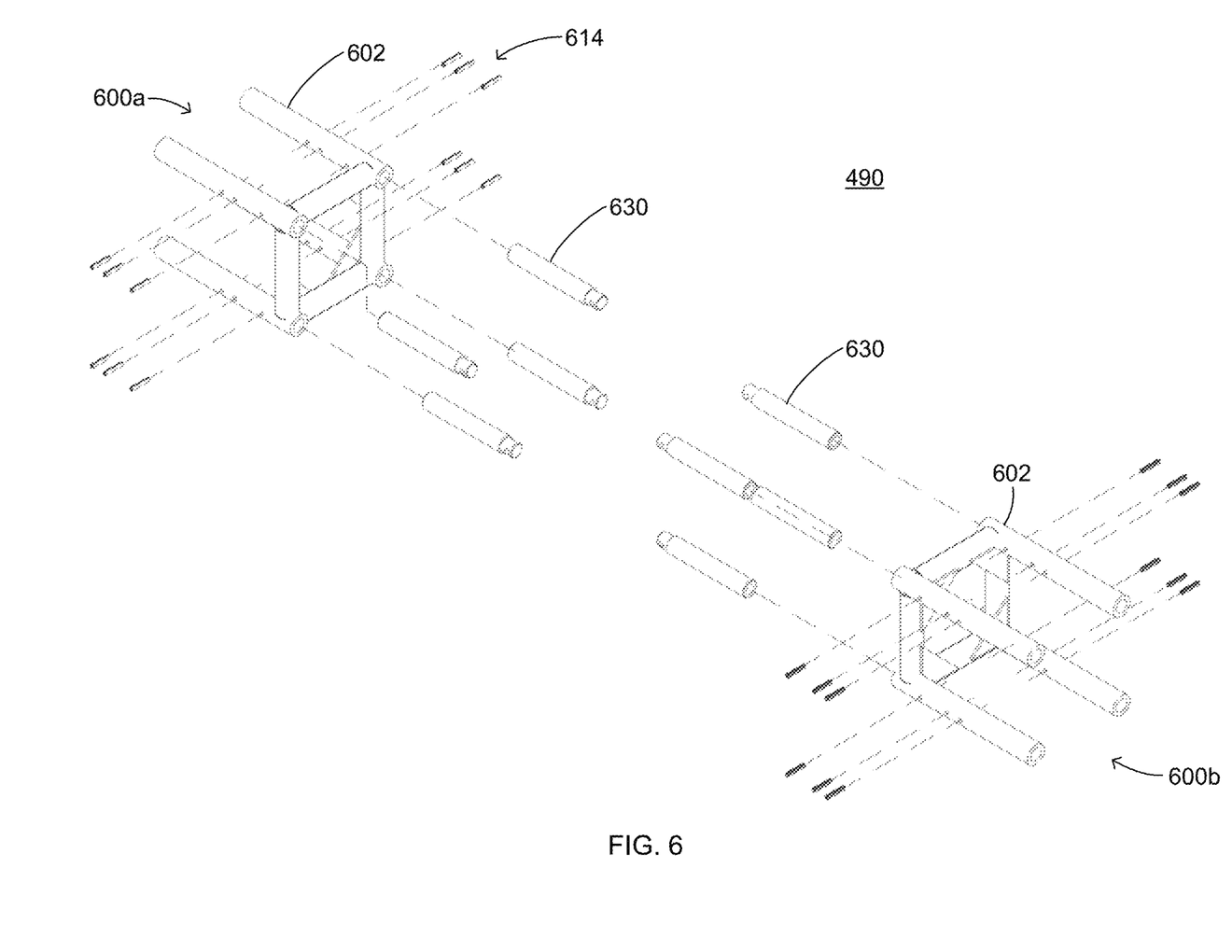
FIG. 6 presents an exploded view of a first step in assembly of the rotatable forkend connection systems of FIGS. 4A-4D.

FIG. 6 presents an exploded view of a first step in assembly of the rotatable forkend connection systems 490 of FIGS. 4A-4D. Truss section 600*a* and 600*b* each includes four truss chords 602. Eight shanks 630 are inserted into the eight chords 602 and are fixedly coupled by twenty-four pins 614 inserted through holes in the eight chords 602 and corresponding holes (not shown) in the eight shanks 630. The pins 614 remain in place by friction while the truss sections 400*a* and 400*b* are in use, but may be removed from the chords 602 and shanks 630 for repair or other reason by use of a pin punch and hammer or other pin-removal tool.

Figure 13:
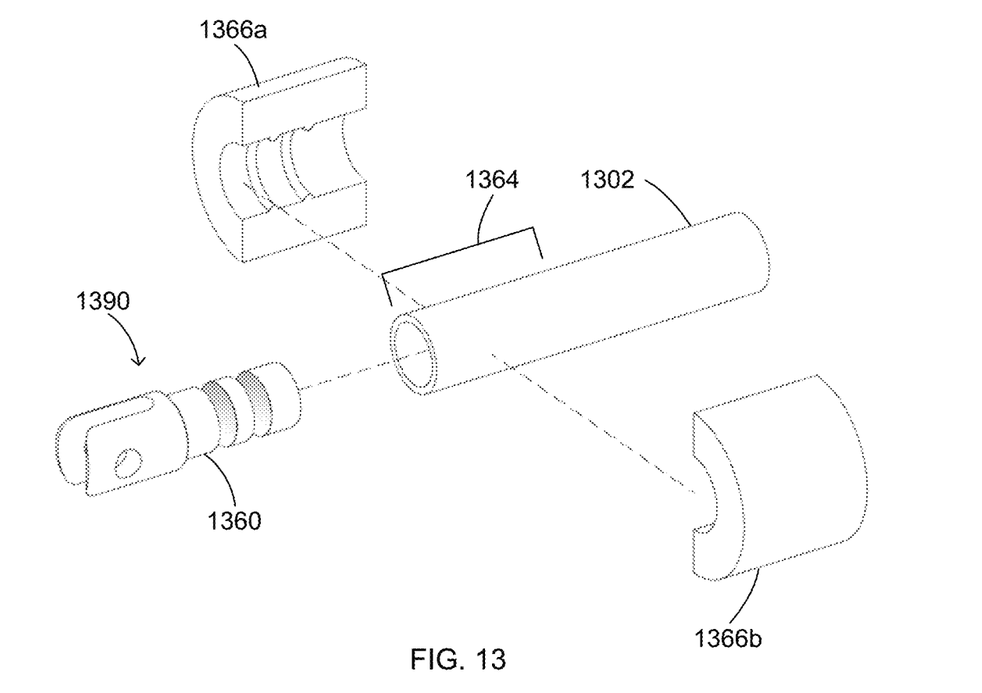
FIG. 13 presents an exploded view of steps in assembly of a rotatable forkend connection system of the sixth embodiment.

In other embodiments, shanks may be fixedly coupled to chords by more or fewer than three pins. In still other embodiments, shanks may be fixedly coupled to the chords by adhesive, a swaging or crimping tool (as shown in FIG. 13), or by other suitable mechanical coupling technique.

Figure 7:
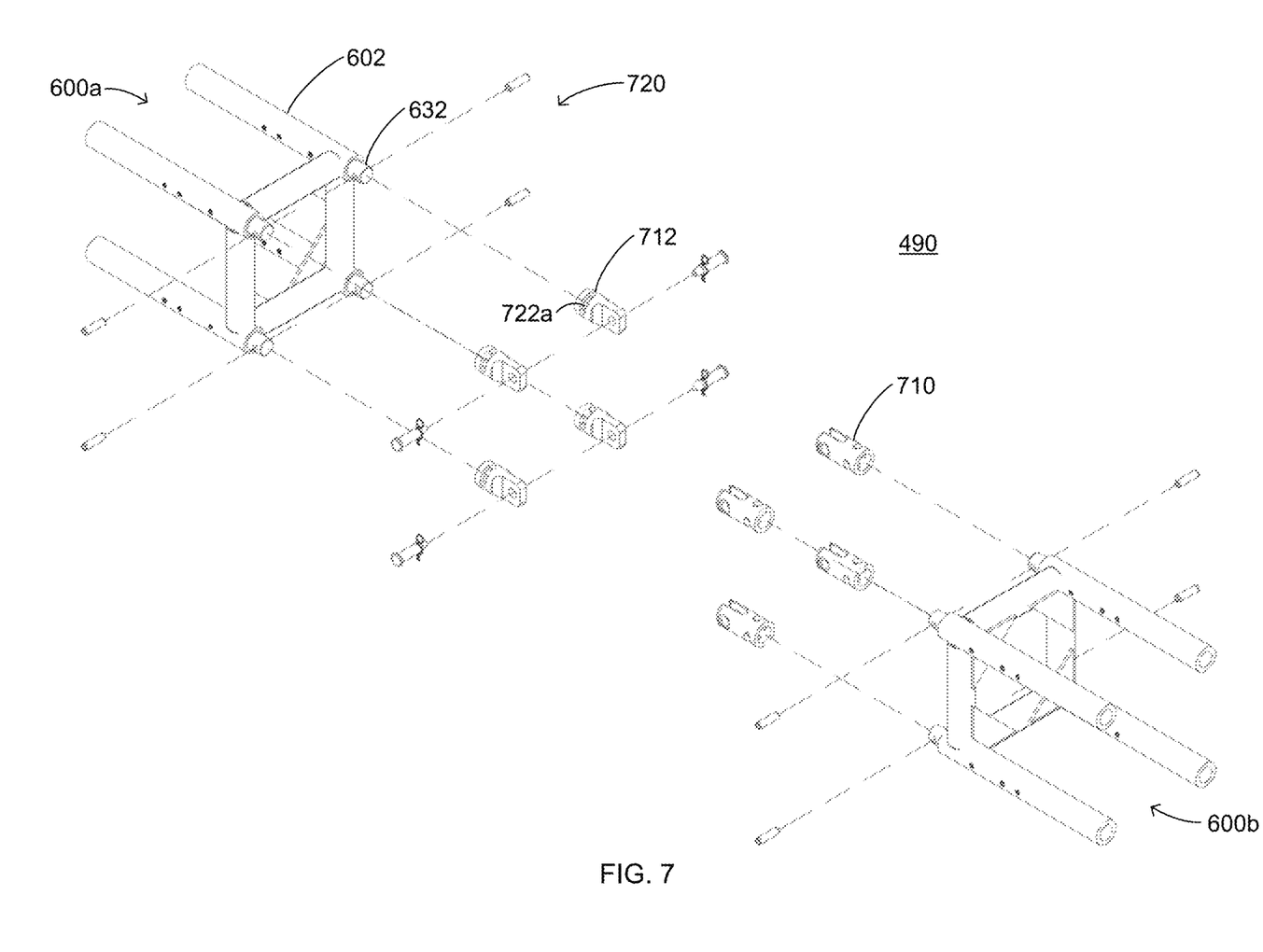
FIG. 7 presents an exploded view of a second step in assembly of the rotatable forkend connection systems of FIGS. 4A-4D.

FIG. 7 presents an exploded view of a second step in assembly of the rotatable forkend connection systems 490 of FIGS. 4A-4D. After insertion of the shanks 630 into the truss chords 602, eight nubs 632 remains extending from the eight truss chords 602. Four male forkend connectors 712 are rotatably coupled to corresponding nubs 632 on truss section 600*a*. Four female forkend connectors 710 are rotatably coupled to corresponding nubs 632 on truss section 600*b*. Pins 720 are inserted through slots 722*a* and 722*b* (not visible) of the connectors 712 and 710 and holes in their corresponding nubs 632 to constrain rotation of the connectors 712 and 710 and restrain their movement along the longitudinal axis of their corresponding truss chords 402. The pins 720 remain in place by friction while the forkend connectors 710 and 712 are in use, but may be removed from the nubs 632 for repair, replacement, or other reason by use of a pin punch and hammer or other pin-removal tool.

Figure 8A:
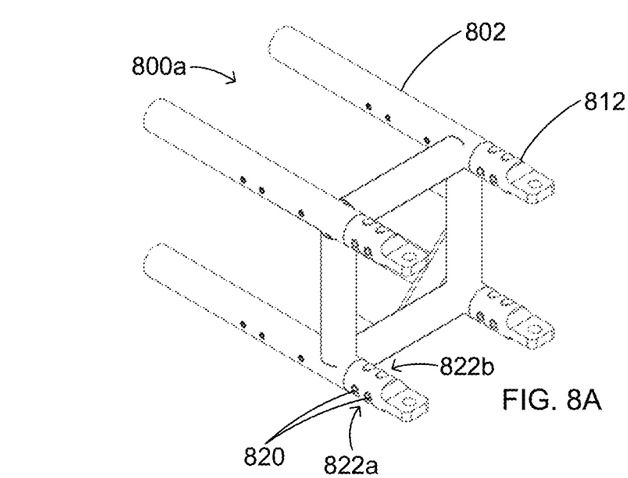
FIGS. 8A and 8B present isometric views of portions of truss sections having a second embodiment of rotatable forkend connection systems according to the disclosure in a first configuration.
Figure 8B:
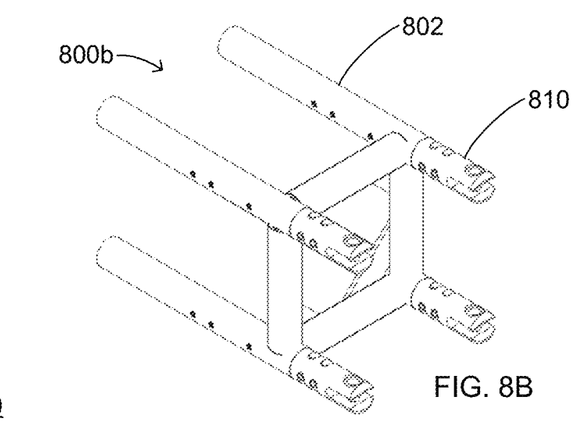
Figure 8C:
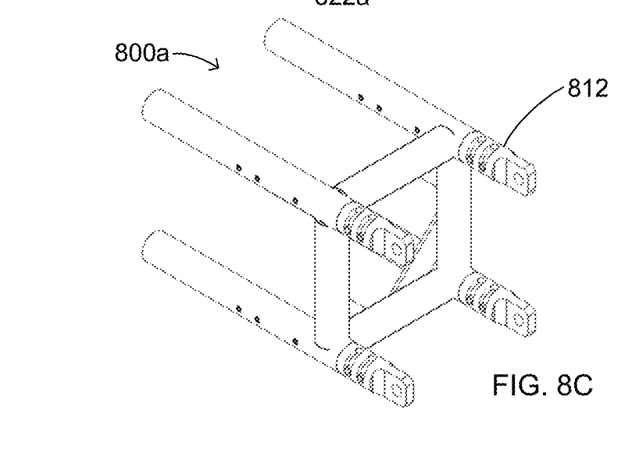
FIGS. 8C and 8D present isometric views of portions of the truss sections of FIGS. 8A and 8B having the forkend connectors in a second configuration.
Figure 8D:
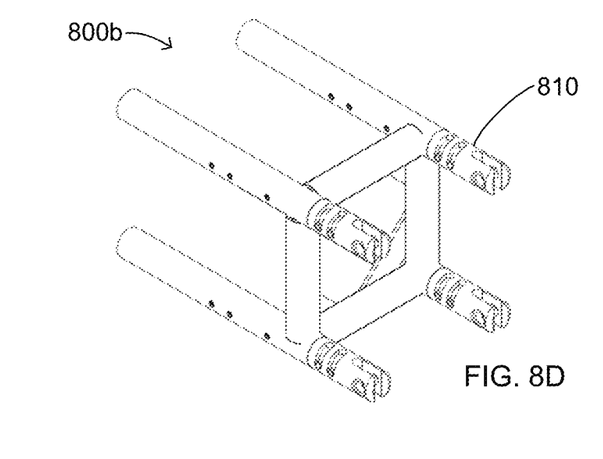

FIGS. 8A and 8B present isometric views of portions of truss sections 800*a* and 800*b* having a second embodiment of rotatable forkend connection systems 890 according to the disclosure in a first configuration. The second embodiment of the rotatable forkend connection system 890 includes the elements shown in FIGS. 8A-D and described herein, other than the truss chords 802. FIGS. 8C and 8D present isometric views of portions of the truss sections 800*a* and 800*b* of FIGS. 8A and 8B having the forkend connectors (812 and 810, respectively) in a second configuration. The second embodiment shown in FIGS. 8A-8D is very similar to the first embodiment, shown in FIGS. 4A-7. However, each forkend connector 810 and 812 has two slots 822*a* that receive a first protruding end of two pins 820, and two slots 822*b* that receive a second, opposite end of the pins 820. Such double slots may be preferred over the single-slot embodiment of FIGS. 4A-7 for use with high load applications, where one or both of the truss sections 800*a* and 800*b* is supporting a heavy payload, or applications where a higher shear force is attempting to displace truss section 800*a* relative to truss section 800*b*, or vice versa. Other embodiments may include more than two slots and two pins. The pins 820 may be removed as described above for the pins 720.

As described with reference to FIGS. 4A-D, in other embodiments the slots 822*a* and 822*b* may subtend any extent of rotation less than 180 degrees that allows the connectors 810 and 812 to remain suitably strong for loads the truss sections 800*a* and 800*b* may encounter. In still other embodiments, the two pins 820 may have a single end that protrudes from the nub, on opposite sides of the nub. In such embodiments, a single slot 822*a* may receive the protruding end of one pin 820 and a single slot 822*b* receive the protruding end of the other pin 820. Because the slots 822*a* and 822*b* are offset from each other along the longitudinal axis of the truss chord 802, the slots 822*a* and 822*b* may subtend 45, 180, 270 degrees or any other selected extent of rotation.

While 3 pins per shank are shown in FIGS. 4A-8D fixedly coupling the shanks in the truss chords 402, 602, and 802, in other embodiments, any number of pins may be used to fixedly couple the shanks to the truss chords, as long as the number and material of the pins is suitable to prevent the shank from being pulled from the truss chord by an expected load exerted on the shank.

Figure 9A:
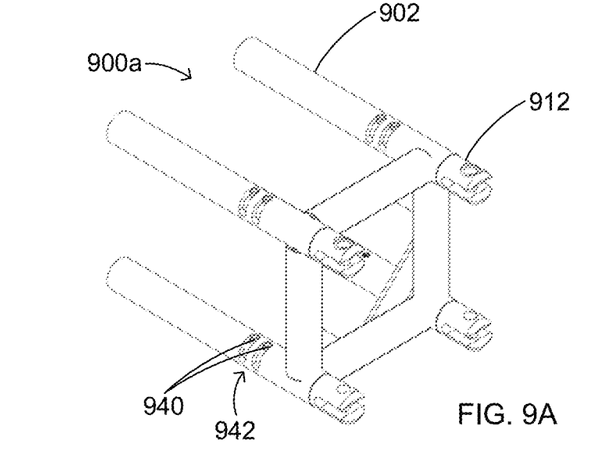
FIGS. 9A and 9B present isometric views of portions of truss sections having a third embodiment of rotatable forkend connection systems according to the disclosure in a first configuration.
Figure 9B:
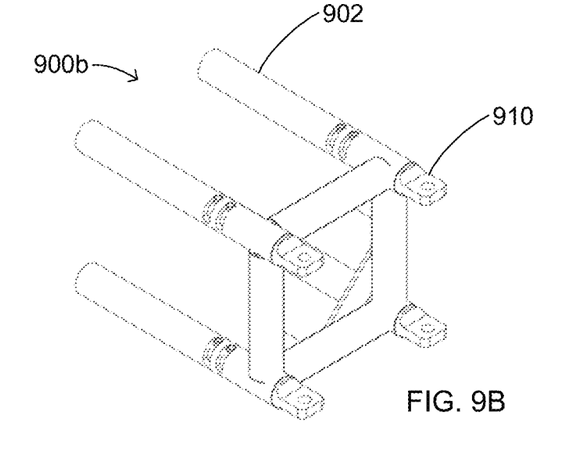
Figure 9C:
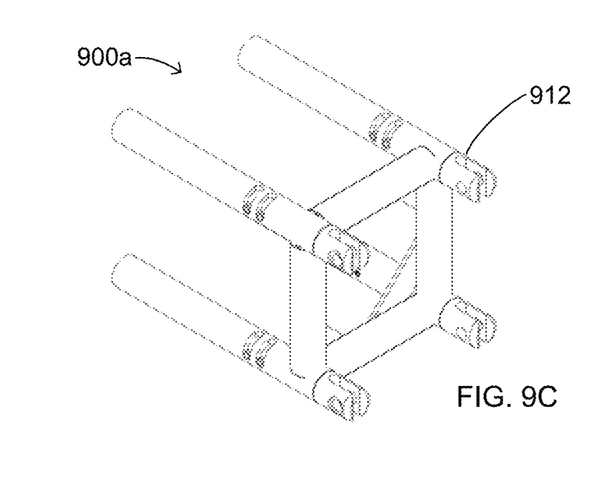
FIGS. 9C and 9D present isometric views of portions of the truss sections of FIGS. 9A and 9B having the forkend connectors in a second configuration.
Figure 9D:
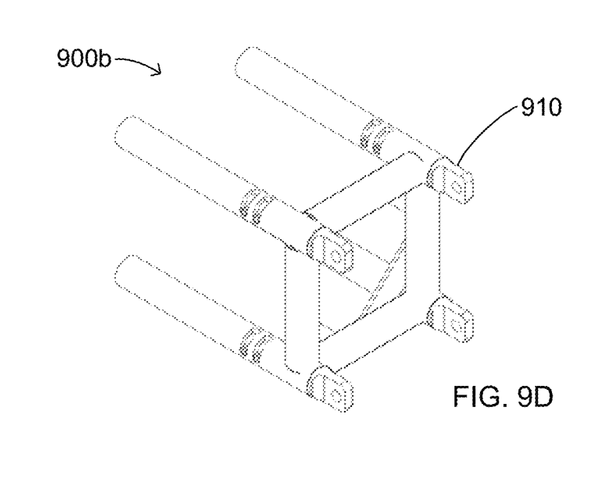

FIGS. 9A and 9B present isometric views of portions of truss sections 900*a* and 900*b* having a third embodiment of rotatable forkend connection systems 990 according to the disclosure in a first configuration. FIGS. 9C and 9D present isometric views of portions of the truss sections 900*a* and 900*b* of FIGS. 9A and 9B having the forkend connectors (912 and 910, respectively) in a second configuration. The connectors 910 and 912 are integral with (or fixedly coupled to) corresponding shafts (not shown) to form a forkend connector assembly. The shaft of each of four connectors 912 and four connectors 910 is inserted into a corresponding truss chord 902 of truss sections 900*a* and 900*b*, respectively. Two pins 940 are fixedly inserted into each shaft and each has an end that protrudes from the shaft to be received by one of the two slots 942 in the truss chord 902. The shafts and the connectors 910 and 912 are thus rotatably coupled to their associated truss chords 902, with an axis of rotation that is coaxial with a longitudinal axis of the truss chord 902. Additionally, the configuration of the pins 940 and the slots 942 restrain each connector 910 and 912 from moving toward or away from its corresponding truss chord 902 along the longitudinal axis of the truss chord 902. The pins 940 remain in place by friction while the forkend connectors 910 and 912 are in use, but may be removed from the shafts for repair, replacement, or other reason by use of a pin punch and hammer or other pin-removal tool.

While 2 pins per shank are shown in FIGS. 9A-9D fixedly coupling the shanks in the truss chords 402, 602, and 802, in other embodiments, any number of pins may be used to fixedly couple the shanks to the truss chords, as long as the number and material of the pins is suitable to prevent the shank from being pulled from the truss chord by an expected load exerted on the shank. Additionally, other embodiments may include more or fewer than two slots and two pins.

Figure 10:
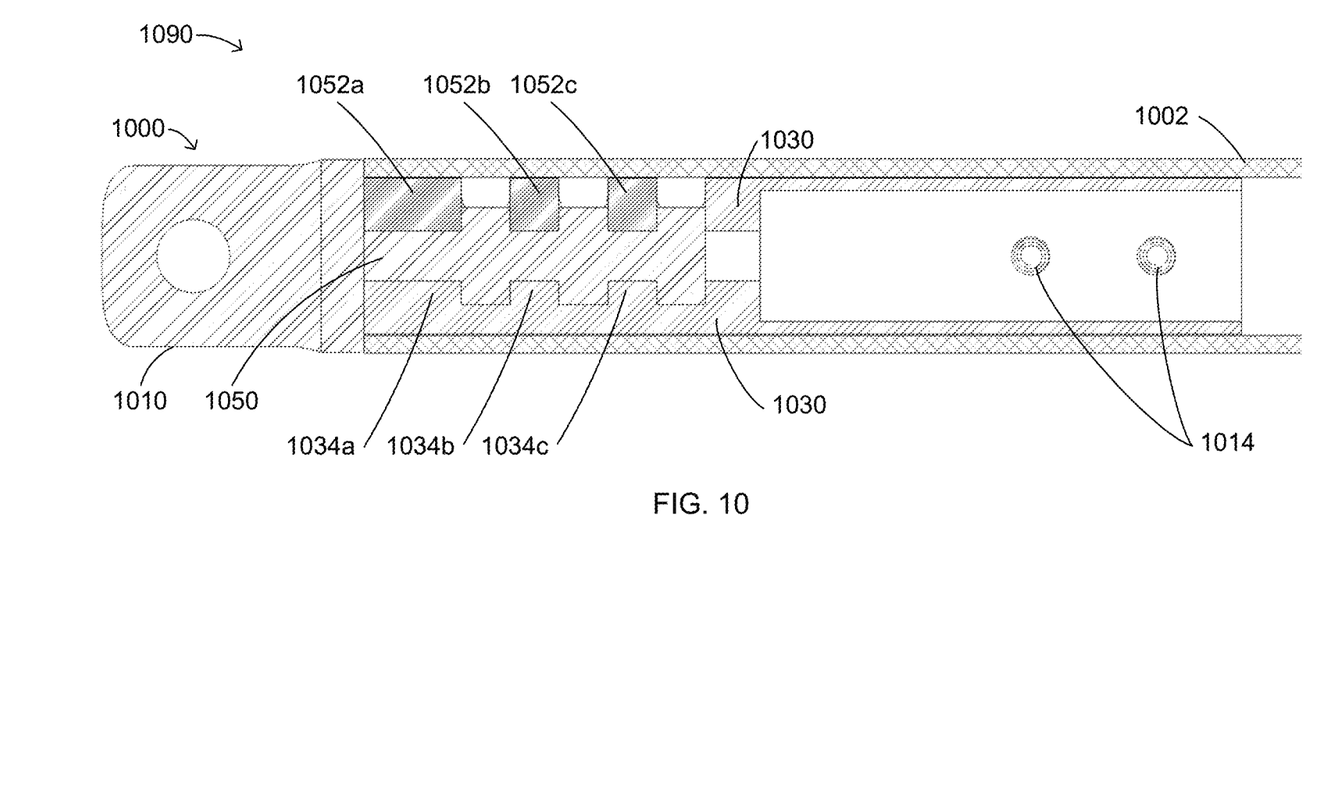
FIG. 10 presents a cutaway view of a fourth embodiment of a rotatable forkend connection system according to the disclosure.

FIG. 10 presents a cutaway view of a fourth embodiment of a rotatable forkend connection system 1090 according to the disclosure. The rotatable forkend connection system 1090 comprises a forkend connector 1000 and a shank 1030. The forkend connector 1000 comprises a male connector 1010 fixedly coupled to a notched shaft 1050 to form a forkend connector assembly. Other embodiments, may include a female forkend connector with a notched shaft. The notched shaft 1050 is rotationally symmetric along its longitudinal axis. The shank 1030 comprises a recess shaped to receive the notched shank 1050. Once the notched shaft is placed in the recess (lowered vertically, in the view shown in FIG. 10), the bushings 152a-c are dropped vertically into the notches of the shaft 1050. The bushings 1052a-c are configured to prevent the notched shaft 1050 from moving vertically away from the longitudinal axis of the shank 1030. This step completes assembly of the rotatable forkend connection system 1090.

The assembled rotatable forkend connection system 1090 is inserted into the truss member 1002 and pins 1014 are fixedly inserted through the truss member 1002 and the shank 1030, to prevent the shank 1030 from rotating within the truss member 1002 and from being withdrawn from the truss member 1002 without first removing the pins 1014, as described above for the pins 614.

Unlike the first through third embodiments of rotatable forkend connection systems according to the disclosure, the rotatable forkend connection system 1090 is configured to allow the connector 1010 to rotate continuously in the shank 1030. However, shoulders 1034a-b of the receiver and the bushings 1052a-c comprise protrusions of the shank 1030 that are received by recesses (notches) of the notched shaft 1050 restrain the forkend connector 1010 from moving along the longitudinal axis of the truss member 1002. Other embodiments may include more or fewer than three shoulders and bushings in the shank and three recesses in the notched shaft.

Figure 11:
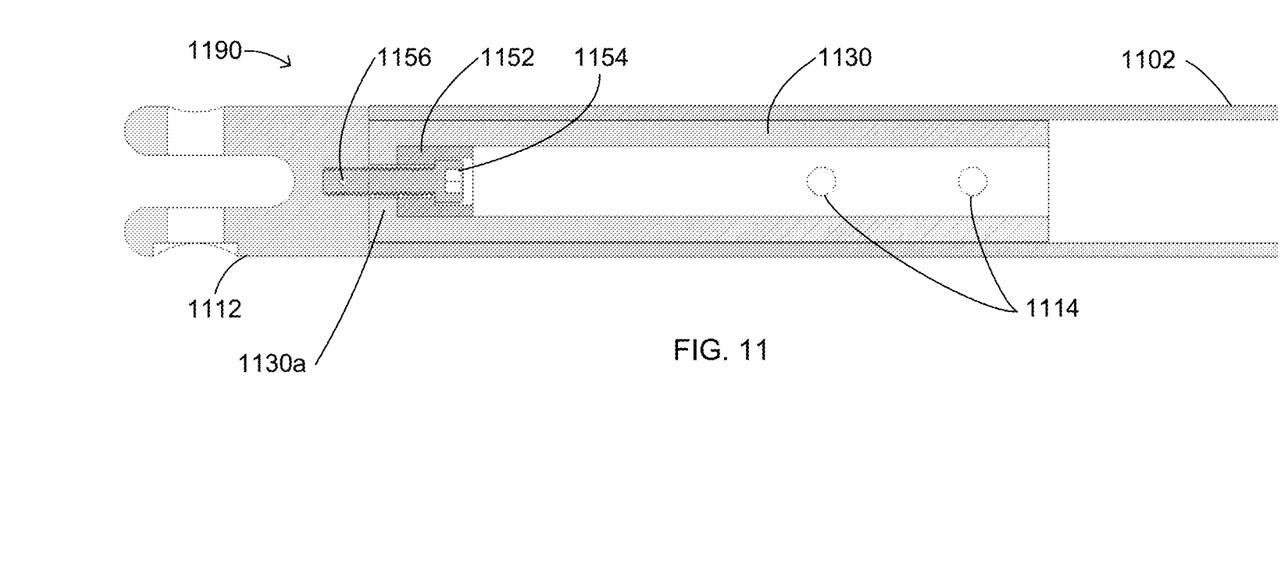
FIG. 11 presents a cutaway view of a fifth embodiment of a rotatable forkend connection system according to the disclosure.

FIG. 11 presents a cutaway view of a fifth embodiment of a rotatable forkend connection system 1190 according to the disclosure. The forkend connection system 1190 comprises a female forkend connector 1112, a shank 1130, a bushing 1152, a screw 1154, and a pin 1156. The bushing 1152 is inserted into a shank 1130 and pushed up against a shoulder 1130a of the shank 1130. A screw 1154 is passed through a first clearance hole in the bushing 1152 and a second clearance hole in the shoulder 1130a to engage a threaded hole in the forkend connector 1112. The screw is only tightened enough to seat a butt end of the connector 1112 securely and rotatably against the shoulder 1130a, while allowing the connector 1112 and the screw 1154 to rotate relative to the shoulder 1130a around a longitudinal axis of the shank 1130. After the screw is at a desired tightness, the pin 1156 is fixedly inserted through the connector 1112 and the screw 1154 to prevent the connector 1112 and the screw 1154 from rotating relative to each other. Together, the connector 1112, bushing 1152, screw 1154, and pin 1156 comprise a forkend connector assembly. This step completes assembly of the rotatable forkend connection system 1190.

In some embodiments, the bushing 1152 may be replaced by a bearing assembly with external or internal balls or rollers. In such embodiments, one or more parts of the bearing assembly may rotate with the screw 1154.

The shoulder 1130a of the shank 1130 comprises a protrusion of the shank 1130 that are received by a recess formed in the forkend connector assembly by the bushing 1152, the screw 1154, and the butt end of the forkend connector 1112 to restrain the forkend connector 1112 from moving along the longitudinal axis of the truss member 1102. Like the fourth embodiment of a rotatable forkend connection system according to the disclosure, the rotatable forkend connection system 1190 is configured to allow the connector 1112 to rotate continuously in the shank 1130.

In some embodiments a removable thread-locking adhesive may be used, instead of a pin, to prevent the connector 1112 and the screw 1154 from rotating relative to each other without disengaging them with the use of tools. It will be understood that in other embodiments, the forkend connector so attached to the shank 1130 may be a male forkend connector.

The assembled rotatable forkend connection system 1190 is inserted into the truss member 1102 and pins 1114 are fixedly inserted through the truss member 1102 and the shank 1130, to prevent the shank 1130 from rotating within the truss member 1102 and from being withdrawn from the truss member 1102 without first removing the pins 1114, as described above for the pins 614.

Figure 12:
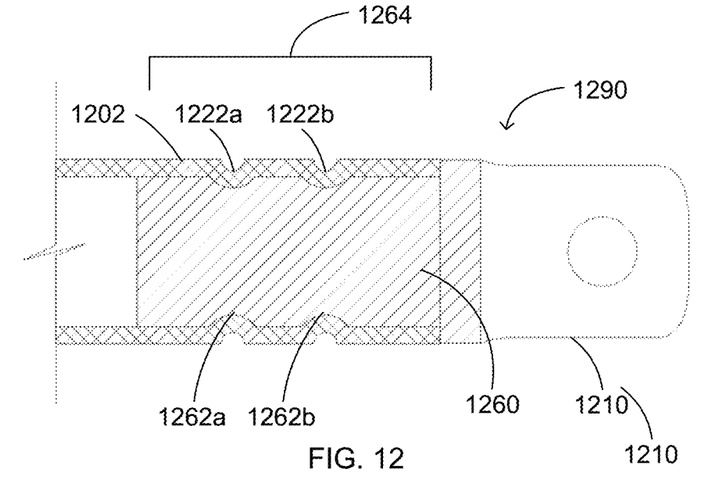
FIG. 12 presents a cutaway view of a sixth embodiment of a rotatable forkend connection system according to the disclosure.

FIG. 12 presents a cutaway view of a sixth embodiment of a rotatable forkend connection system 1290 according to the disclosure. The forkend connection system 1290 comprises a male forkend connector 1210 fixedly coupled to a shaft 1260 to form a forkend connector assembly. The shaft 1260 includes circumferential grooves 1262a and 1262b. Other embodiments may include more or fewer circumferential grooves. By a method explained in greater detail with reference to FIG. 13, protrusions 1222a and 1222b are formed in a shank region 1264 of a wall of a truss section 1202. The protrusions 1222a and 1222b are configured to allow continuous rotation of the forkend connection system 1290 in the truss section 1202, but are configured to be received by the circumferential grooves 1262a and 1262b (recesses) of the shaft 1260 to restrain the forkend connector 1210 from moving along the longitudinal axis of the truss member 1202.

FIG. 13 presents an exploded view of steps in assembly of a rotatable forkend connection system 1390 of the sixth embodiment. A shaft 1360 is inserted into a shank region 1364 of a truss section 1302, and forming dies 1366a and 1366b are pressed into the shank region 1364 to form protrusions (not shown) on the inside wall of the shank region 1364 of the truss section 1302 to engage circumferential grooves of the shaft 1360.

The embodiments in this disclosure are shown coupling box truss sections with four chords. It will be understood that forkend connectors according to the disclosure may be used to couple trusses having any number of chords, arranged in any geometry relative to each other. Forkend connectors according to the disclosure may be used to couple complete, unsectioned trusses to other unsectioned trusses or truss sections. Furthermore, forkend connectors according to the disclosure may be used to couple scaffolding parts, such as standards, ledgers, braces, etc. Still further, forkend connectors according to the disclosure may be used to couple objects of any geometry where the object provides a socket or other feature to receive the shank of the forkend connector. Such objects may include, for example, projector screens, video projectors, and set pieces. The term 'devices' is used herein to refer to trusses, scaffolding parts, and other objects coupled using forkend connectors according to the disclosure. The term 'device member' is used to refer to the truss chord, scaffolding part, or object feature to which the forkend connector couples.

Additionally, while the embodiments disclosed herein are adapted to device members having a circular cross section, it will be clear that the embodiments shown in FIGS. 4A-8D, 10, and 11 may be adapted for use with device members of any cross section.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A rotatable forkend connection system, comprising:
a shank coupled to a device member by a first coupling configured to prevent rotation of the shank relative to the device member, the shank extending within the device member along a longitudinal axis of the device member, the shank comprising a protrusion extending from the shank in a direction perpendicular to the longitudinal axis of the device member; and
a forkend connector coupled to the shank by a second coupling configured to allow rotation of the forkend connector relative to the shank, an axis of rotation of the forkend connector coaxial with the longitudinal axis of the device member,
wherein the forkend connector comprises a recess configured to receive the protrusion, the protrusion and the recess configured to prevent the forkend connector from moving along the longitudinal axis of the device member, the recess configured to constrain rotation of the forkend connector around the axis of rotation to a predetermined number of degrees of rotation.

2. The rotatable forkend connection system of claim 1, wherein:
the shank comprises a nub extending from an end of the device member and coaxially with the longitudinal axis of the device member, and
the protrusion extends from the nub.

3. The rotatable forkend connection system of claim 2, further comprising:
a second protrusion extending from the nub in a second direction perpendicular to the longitudinal axis of the device member; and
a second recess in the forkend connector, configured to receive the second protrusion,
wherein the second protrusion and the second recess are configured to further restrain the forkend connector from moving along the longitudinal axis of the device member.

4. The rotatable forkend connection system of claim 1, wherein the forkend connector comprises one of a male connector and a female connector, wherein the recess of the male forkend connector is configured to constrain rotation of the male forkend connector to one of clockwise and counterclockwise rotation, when viewed looking from the forkend connector to the device member, and the recess of the female forkend connector is configured to constrain rotation of the female forkend connector to the other one of clockwise and counterclockwise rotation.

* * * * *